United States Patent Office 3,551,432
Patented Dec. 29, 1970

3,551,432
1-LOWERALKANOYL-NIPECOTONITRILES
Norman L. Wendler, Summit, David Taub, Metuchen, and Chan Hwa Kuo, South Plainfield, N.J., assignors to Merck & Co., Inc., Rahway, N.J., a corporation of New Jersey
No Drawing. Original application June 3, 1966, Ser. No. 554,999, now Patent No. 3,435,044. Divided and this application June 10, 1968, Ser. No. 765,713
Int. Cl. C07d 29/32
U.S. Cl. 260—294.3                    4 Claims

ABSTRACT OF THE DISCLOSURE

Nicotinonitrile is produced by reacting 1-acyl-3-cyano-4-amino-1,2,5,6-tetrahydropyridine with a strong acid to produce a tautomeric mixture of 1-acyl-3-cyano-4-keto-hexahydropyridine and 1-acyl-3-cyano-4-hydroxy-1,2,5,6-tetrahydropyridines, reducing this tautomeric mixture with borohydride to produce a mixture of cis and trans isomers of 1 - acyl-3-cyano-4-hydroxyhexahydropyridine, acylating these isomers to produce the corresponding 4-acyloxy derivatives, and dehydrogenating the latter derivatives with a noble metal. Alternatively, the 4-acyloxy derivative is contacted with a strong base to produce 1-acyl-3-cyano-1,2,5,6-tetrahydropyridine which is reacted with a noble metal to produce nicotinonitrile. Nicotinonitrile is useful as an intermediate in the preparation of nicotinamide.

CROSS-REFERENCE TO RELATED APPLICATION

This is a division of Ser. No. 554,999, filed June 3, 1966, now U.S. Pat. 3,435,044, issued Mar. 25, 1969.

This invention relates to processes for the preparation of nicotinamide. More particularly, it is concerned with methods of preparing nicotinonitriles from 4-amino-1,2,5,6-tetrahydropyridine and new pyridine compounds useful as intermediates in these processes.

The methods presently available for producing nicotinamide utilize various substituted pyridines as starting materials. These pyridines are relatively expensive and from time to time are in short supply. Hence, other methods for producing nicotinamide utilizing other starting materials have been sought.

It is an object of this invention to provide methods of producing nicotinonitrile, which can be converted to nicotinamide by known methods, utilizing as the starting material 1 - acylated derivatives of 4-amino - 3 - cyano-1,2,5,6-tetrahydropyridine. Another object is to provide 1-acyl-3-cyano-4-hydroxyhexahydropyridines, the corresponding 4-acyloxy derivatives, 1-acyl-3-cyano-4-keto-hexahydropyridines, 1 - acyl-3-cyano-4-hydroxy - 1,2,5,6-tetrahydropyridines, and processes of preparing these compounds. A further object is to provide methods for the production of these new compounds. Other objects will be apparent from the detailed description hereinafter provided.

In accordance with one embodiment of this invention, it is now found that nicotinonitrile can be prepared by the following processes:

Flowsheet

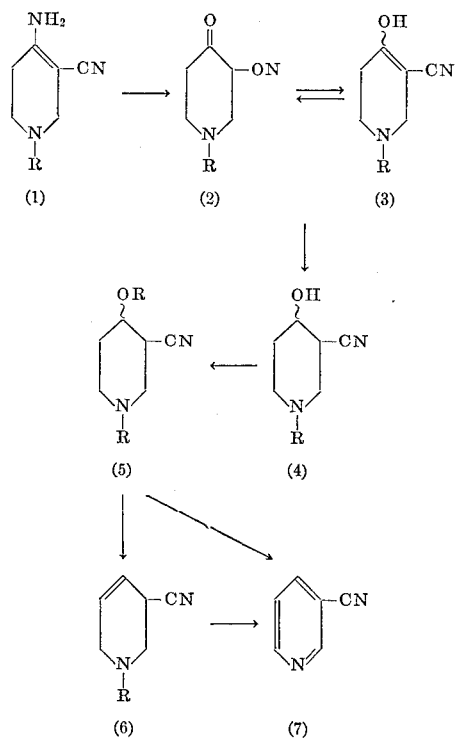

wherein R represents a lower alkanoyl acyl group.

In accordance with the above flow diagram, 1-acyl-3-cyano-4-amino-1,2,5,6-tetrahydropyridine (1) is intimately contacted with a strong acid in aqueous solution to produce a tautomeric mixture of 1-acyl-3-cyano-4-keto-hexahydropyridine (2) and 1-acyl-3-cyano-4-hydroxy-1,2,5,6-tetrahydropyridine (3). Reduction of this tautomeric mixture with borohydride produces a mixture of the cis and trans isomers of 1-acyl-3-cyano-4-hydroxyhexahydropyridine (4), which is acylated to produce the corresponding 4-acyloxy derivative (5). The latter compound is then dehydrogenated with a noble metal to produce nicotinonitrile (7). Alternatively, compound (7) is intimately contacted with a strong base to produce 1-acyl-3-cyano-1,2,5,6-tetrahydropyridine (6), which is reacted with a noble metal to produce the desired nicotinonitrile.

In accordance with the first step of the process of our invention, the starting material, 1-acyl-4-amino-3-cyano-1,2,5,6-tetrahydropyridine, is contacted in an aqueous medium with a strong acid to produce 1-acyl-3-cyano-4-ketohexahydropyridine, which exists in equilibrium with the tautomeric compound 1 - acyl - 3-cyano-4-hydroxy-1,2,5,6-tetrahydropyridine. Although various 1-acyl compounds can be used in this step of our process, we prefer to utilize the 1-lower alkanoyl derivatives such as the 1-acetyl, 1-butyryl, and 1-hexanoyl derivatives since these compounds are conveniently prepared by acylation of the unacylated compound.

In carrying out this acidic rearrangement, the compound to be treated is dissolved in a dilute aqueous solution of a strong mineral acid and allowed to stand at ambient temperatures of about 0–50° C. and preferably about 25° C. for a short period of time of from a few minutes up to about one hour. Among the acids which can be employed in this hydrolytic reaction are the non-oxidizing mineral acids such as hydrochloric acid, hydrobromic acid, sulfuric acid, and phosphoric acid as well as the strong organic acids such as trifluoroacetic acid, i.e., having a dissociation constant greater than about $1 \times 10^{-2}$, and insoluble acids such as the strongly acidic ion exchange resins. For example, ion exchange resins which are polymers of styrene and divinylbenzene having active sites derived from organic sulfonic acids dispersed throughout the polymer lattice are suitable for this purpose. Such strongly acidic ion exchange resins include inter alia the Dowex 50 resins of the Dow Chemical Company, the Amberlite IR–120 ion exchange resin of the Rohm & Haas Company, and the Permutit Q resin of the Permutit Company.

In using the ion exchange sulfonic acid type resins, the procedure employed is to prepare an aqueous slurry of the 4-aminotetrahydropyridine compound and the ion exchange resin. The reaction mixture is stirred, preferably at room temperature, for a period of from a few minutes up to one or two hours. Sufficient ion exchange resin is supplied to the reaction mixture to give a definite acidic reaction to the aqueous slurry, i.e., so that the aqueous reaction mixture has a pH of less than about 3. The product is obtained by separating the insoluble resin and evaporating the resulting solution to dryness.

When reaction is effected in aqueous solution with a string acid, the reaction product is neutralized with an alkali and the product is obtained by concentrating the reaction mixture to dryness and subsequently extracting the resulting residue with organic solvents for the product such as methanol, toluene, benzene, and the like. The organic solvents are then removed by evaporation and the product crystallized, preferably from acetone, to yield the tautomeric mixture of the 4-keto and 4-hydroxy compounds.

The second step of the process of our invention comprises reducing the tautomeric mixture of 1-acyl-3-cyano-4-ketohexahydropyridine and 1-acyl-3-cyano-4-hydroxy-1,2,5,6-tetrahydropyridine by treatment with a borohydride reducing agent to produce a mixture of the cis and trans isomers of the 1-acyl-3-cyano-4-hydroxyhexahydropyridine compound. Reducing agents suitable for this purpose are alkali and alkaline earth borohydrides such as lithium, potassium, and sodium borohydride and the calcium and magnesium borohydrides. When an excess of the borohydride is brought into intimate contact with the 1-acyl-3-cyano-4-ketohexahydropyridine for sufficient time to complete the reaction, the corresponding 4-hydroxy compound is obtained. Following the reaction, the excess borohydride reagent is destroyed by the addition of a solution of an acid and the product recovered by evaporating the reaction mixture to dryness under reduced pressure and extracting the residue with a suitable solvent for the product such as acetone.

The 1-acyl-3-cyano-4-hydroxyhexahydropyridine so obtained is then acylated, preferably with a lower alkanoic acid acylating agent, to produce the corresponding 1-acyl-4-acyloxy-3-cyanohexahydropyridine. For example, the product of the reduction with the borohydride can be acylated by reaction with a lower alkanoyl anhydride or an acid halide of a lower alkanoic acid in the presence of an acid-binding agent to produce the corresponding 4-acyloxy compound. Thus, the cis or trans 1-alkanoyloxy-4-hydroxyhexahydropyridine compound can be contacted with an anhydride of a lower alkanoic acid such as acetic acid anhydride, propionic acid anhydride, butyric acid anhydride, and the like to produce the corresponding 4-acyloxy compound. Alternatively, the acylation can be effected by reaction of the 4-hydroxy compound with an acid chloride or acid bromide of a lower alkanoic acid such as acetic, propionic, butyric, valeric, or hexanoic acid in the presence of an acid-binding agent such as pyridine, collidine, lutidine, and the like. The product which is formed in substantially quantitative yield is readily obtained by evaporating the reaction mixture to dryness under reduced pressure, extracting an aqueous slurry of the resulting residue with chloroform, and concentrating the solvent extract.

Pursuant to a further embodiment of our invention, the 1-acyl-4-acyloxy-3-cyanohexahydropyridine is reacted under substantially anhydrous conditions with a strong base to produce 1-acyl-3-cyano-1,2,5,6-tetrahydropyridine. The reaction is conveniently carried out by dissolving the starting material in a solvent for the compound, adding thereto an equivalent molar amount of a strong base such as an alkali or alkaline earth metal oxide, and maintaining the hexahydropyridine compound in contact with the strong base for sufficient time to complete the reaction. It is preferred to use strong bases such as alkali alkoxides, for example, alkoxides formed by reaction of alkali metals with tertiary aliphatic alcohols in effecting this step of our process. Thus, 1-acyl-3-cyano-1,2,5,6-tetrahydropyridine is obtained by reacting 1-acyl-3-cyano-4-acyloxyhexahydropyridine with potassium tertiary butoxide in tertiary butanol, diluting the reaction mixture with water, extracting with a non-polar organic solvent such as chloroform, and evaporating the chloroform extract. The product so obtained can be further purified by chromatography on neutral aluminum. Thus, 1-acetyl-3-cyano-1,2,5,6-tetrahydropyridine and other 1-acyl compounds wherein the 1-acetyl group is replaced by a 1-propionyl, 1-butyryl, 1-valeryl, and 1-hexanoyl substituent can be obtained in this way.

In the last step of our process, the 1-acyl-3-cyano-1,2,5,6-tetrahydropyridine or the 1-acyl-4-acyloxy-3-cyanohexahydropyridine are treated by heating in contact with a noble metal catalyst to effect aromatization of the 6-membered nitrogen-containing ring to produce nicotinonitrile. In accordance with this step of our invention, the 1-acyl-3-cyano-1,2,5,6-tetrahydropyridine or 1-acyl-3-cyano-4-acyloxyhexahydropyridine is dehydrogenated by heating in intimate contact with a noble metal such as finely-divided palladium, platinum, ruthenium, rhodium, osmium or iridium or such a metal supported on activated carbon at temperatures of between 100° C. to 300° C. for a period of from 1 to 10 hours. In the preferred method of operation, the compound to be dehydrogenated is heated with the noble metal in an inert solvent such as a high-boiling ether or hydrocarbon having a boiling point of from about 100° C. to 300° C. at a temperature of about 200–250° C. for sufficient time to complete the dehydrogenation. Suitable solvents which can be used in our dehydrogenation process include saturated polycyclic hydrocarbons such as decalin or stilbene or high-boiling ethers such as diphenyl ether.

The following examples are presented to illustrate methods of carrying out the present invention.

EXAMPLE 1

1-acetyl-3-cyano-4-ketohexahydropyridine and 1-acetyl-3-cyano-4-hydroxy-1,2,5,6-tetrahydropyridine A solution of 1 gram of 1-acetyl-3-cyano-4-amino-1,2,5,6-tetrahydropyridine in 3 ml. of 2.5 N aqueous hydrochloric acid is allowed to stand at room temperature (25° C.) for approximately 10 minutes. The entire reaction mixture is then neutralized to phenolphthalsin with aqueous 2.5 N sodium hydroxide solution and concentrated in vacuo leaving the product as a residue. The residual material is flushed with methanol and toluene to remove impurities and subsequently acidified to pH 4 with aqueous 2.5 N hydrochloric acid, and again concentrated to dryness. The residual partially-pure product is flushed with two portions of benzene to remove additional impurities and the remaining residue containing the product is extracted by slurrying with five 15 ml. portions of hot acetone. The acetone solution of product is then filtered to remove insoluble, inorganic impurities and the acetate filtrate containing the product concentrated in vacuo to yield 1 g. of substantially pure product in excellent yield, M.P. 134–136° C., $\lambda_{infl.}^{CH_3OH}$ 228 m$\mu$ (2,200), $\lambda_{max.}^{CH_3OH+OH^-}$ 262 m$\mu$ (11,400)

The infrared spectrum of the product, 1-acetyl-3-cyano-4-keto-hexahydropyridine exhibited OH as well as C=O absorption at $\lambda_{max.}^{Nujol}$ 3.2, 3.8 and 5.83$\mu$ respectively indicating the presence of both keto and enol forms. The product formed a crystalline enol acetate, M.P. 74–76° C., $\lambda_{max.}^{CH_3OH}$ 203 m$\mu$ (15,000)

and an enol methyl ether derivative, M.P. 99–100° C.

$\lambda_{max.}^{CH_3OH}$ 237 m$\mu$ (11,700) and 206 m$\mu$ (8,850)

The starting material of this example can be prepared as follows:

To a stirred slurry of 32.0 grams of 4-amino-3-cyano-1,2,5,6-tetrahydropyridine in 300 ml. of pyridine is added 150 ml. of acetic anhydride while cooling the reaction mixture to maintain the temperature at about 30° C. During a period of about 15–20 minutes, the stirred material dissolved in solution gives a light yellow solution and the product begins to precipitate. The reaction is allowed to proceed for an additional 1½ hours and the precipitated product is removed by filtration, washed successively with toluene and ether, and air dried to give substantially pure 1-acetyl-4-amino-3-cyano-1,2,5,6-tetrahydropyridine, M.P. 174–177° C. On recrystallization of the product from acetone, the product exhibits the following characteristics: M.P. 177–178° C.;

$\lambda_{max.}^{MeOH}$ 363 m$\mu$, (E, 11,600), $\lambda_{max.}^{Nj}$ 2.92, 2.99, 3.09 (H—H), 4.64 (C≡H), 6.06, 6.15$\mu$ (—NH$_2$ and N—COCH$_3$)

When this process is carried out using an equivalent molar amount of a lower alkanoic acid anhydride such as butyric acid anhydride, hexanoic acid anhydride, propionic acid anhydride and the like, the corresponding 1-acyl-3-cyano-4 - amino - 1,2,5,6 - tetrahydropyridine is obtained. These acyl derivatives can be reacted with dilute hydrochloric acid as described above to produce a tautomeric mixture of the corresponding 1-acyl-3-cyano-4-ketohexahydropyridine and 1-acyl-3-cyano-4-hydroxy-1,2,5,6-tetrahydropyridine compounds.

EXAMPLE 2

1-acetyl-3-cyano-4-ketohexahydropyridine and 1-acetyl-3-cyano-4-hydroxy-1,2,5,6-tetrahydropyridine A mixture of 10 grams of 1-acetyl-3-cyano-4-amino-1,2,5,6-tetrahydropyridine and 120 cc. of a water slurry of Amberlite IR–120 ion exchange resin (240 mmol) and 50 cc. of water is stirred at room temperature (25° C.) for about 30 minutes. At the end of the stirring period the resin is removed from the reaction mixture by filtration and washed with water to remove any occluded product. The filtrate and resin washings are combined and concentrated to dryness to yield the product as a residue which crystallizes from a mixture of acetone and ether to give a good yield of a tautomeric mixture of 1-acetyl-3-cyano-4-hydroxyl-1,2,5,6-tetrahydropyridine and 1-acetyl-3-cyano-4-ketohexahydropyridine. M.P. 134–136° C.

EXAMPLE 3

1-acetyl-3-cyano-4-hydroxypiperidine

A stirred solution of 1.0 gram of the tautomeric mixture of 1-acetyl-3-cyano-4-ketohexahydropyridine and 1-acetyl-3-cyano-4-hydroxy-1,2,5,6-tetrahydropyridine in 12 ml. of water is mixed with 300 mg. of sodium borohydride in 5 ml. of water. The progress of the reaction is followed by measurement of the disappearance of the ultraviolet absorption. The absorption is essentially zero in about 10 minutes, indicating reduction of the keto substituent at position 4 and production of 1-acetyl-3-cyano-4-hydroxypiperidine. The excess sodium borohydride reagent is destroyed by the addition of 1:1 aqueous acetic acid solution and the entire neutralized reaction mixture concentrated to dryness under reduced pressure, leaving a residue containing the product. The residue is triturated with acetone and the acetone extract concentrated to dryness, leaving the substantially pure 1-acetyl-3-cyano-4-hydroxypiperidine as a colorless oil in quantitative yield. Thin-layer chromatography, using a mixture of chloroform-methanol in a proportion of 25:1 indicates that the product is composed of both the cis and the trans isomers.

This procedure is repeated, utilizing as starting material the filtrate obtained in accordance with the procedure of Example 2 without isolating the intermediate product to obtain 1-acetyl-3-cyano-4-hydroxypiperidine in excellent yield.

$\lambda_{max.}^{chf}$ 2.9 (OH), 4.48 (CN), 6.12$\mu$ 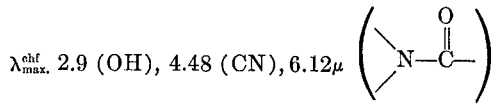

When tautomeric mixtures of other 1-acyl compounds such as the 1-propionyl, 1-butyryl or the 1-hexanoyl compounds are reacted with sodium borohydride in accordance with the procedures described above the corresponding 1-acyl-3-cyano-4-hydroxy-piperidines are produced.

EXAMPLE 4

1-acetyl-3-cyano-4-acetoxypiperidine

A solution of 1.0 g. of 1-acetyl-3-cyano-4-hydroxypiperidine in 2 ml. of acetic anhydride and 3 ml. of pyridine is maintained at 25° C. for 18 hours. The reaction mixture containing the product is concentrated to dryness, the dried residue diluted with water, and the resulting aqueous slurry extracted with chloroform. The chloroform extract containing the product is washed with dilute hydrochloric acid, dilute aqueous potassium bicarbonate, sodium chloride and subsequently dried over magnesium sulfate. The product, 1-acetyl-3-cyano-4-acetoxypiperidine, is obtained as a residual oil by removal of the solvent in vacuo. The product is obtained in substantially pure form as a colorless viscous oil by molecular distillation (B.P. 185–190/0.05 mm.)

$\lambda_{max.}^{chf}$ 4.41 (CN), 5.72, 8.1—8.2 (OAc), 6.05$\mu$ 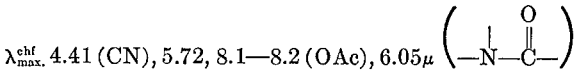

Following the above procedure other 1-acyl piperidine compounds such as the 1-butyryl and 1-hexanoyl compounds can be reacted with lower alkanoic acid anhydrides to produce the corresponding 4-acyloxy derivatives.

EXAMPLE 5

1-acetyl-3-cyano-4-acetoxy-1,2,5,6-tetrahydropyridine

A solution of 200 mg. of the tautomeric mixture of 1-acetyl-3-cyano-4-ketohexahydropyridine and 1-acetyl-3-cyano-4-hydroxy-1,2,5,6-pyridine in 1 ml. of acetic anhydride and 1 ml. of pyridine is maintained at 25° C. for about 18 hours. The entire reaction mixture containing the product is then concentrated to dryness in vacuo and flushed with pyridine to leave the product in solid form as a residue. The residue is crystallized from a mixture of ether and acetone. M.P. 74–76° C.

$\lambda_{max.}^{CH_3CN}$ 203 m$\mu$, (15,000); $\lambda_{max.}^{MeOH}$ 202 m$\mu$, (15,700); $\lambda_{max.}^{chf}$ 4.48 (—CN), 5.65 (anol acetate) 6.07 (amide), 8.50$\mu$ (enol ester)

EXAMPLE 6

Potassium enolate of 1-acetyl-3-cyano-4-hydroxy-1,2,5,6-tetrahydropyridine

To a solution of 200 mg. of the tautomeric mixture obtained in Example 1 in 3 ml. of 1 N hydrochloric acid is added excess solid potassium bicarbonate. The basic solution is taken to dryness and the residue extracted with 1:1 acetone-methanol. Concentration of the filtrate gives the crude potassium enolate, purified by crystallization from acetone containing a little methanol; needles (110 mg.), M.P. 240° C. dec.

$\lambda_{max.}^{MeOH}$ 263 m$\mu$ ($\epsilon$, 6,000); $\lambda_{max.}^{chf.}$ 4.60 (—C≡N), 6.10 (amide) 6.5 (enolate anion)

*Analysis.*—Calculated for $C_8H_9N_2O_2K$ (percent): K, 19.14. Found (percent): K, 19.82.

EXAMPLE 7

1-acetyl-3-cyano-1,2,5,6-tetrahydropyridine

To a stirred solution of 510 mg. of 1-acetyl-3-cyano-4-acetoxypiperidine in 3 ml. of t-butanol under an atmosphere of nitrogen is added 2.5 ml. of 1.03 N potassium t-butoxide in t-butanol over a period of about 10 minutes while maintaining the temperature of the reaction mixture at 20° C. The reaction mixture is diluted with water and the product, 1-acetyl-3-cyano-1,2,5,6-tetrahydropyridine, extracted with chloroform. The chloroform extract is washed and dried and evaporated under reduced pressure to yield a noncrystalline residue consisting of impure product. The product is obtained in substantially pure form by chromatography on a column containing 15 grams of neutral alumina. The product is obtained by elution of the column successively with benzene followed by benzene-chloroform (1:1) and chloroform.

$\lambda_{max.}^{MeOH}$ 212 m$\mu$ (E, 8,600), $\lambda_{max.}^{chf.}$ 4.49 (CN), 6.10$\mu$ $$\left(\begin{array}{c} \text{O} \\ | \ \| \\ -\text{N}-\text{C}- \end{array}\right)$$

Reaction of other lower alkanoic acid esters of 3-cyano-4-hydroxypiperidine with potassium tertiary butoxide by the above procedure produces the corresponding 1-acyl-3-cyano-1,2,5,6-tetrahydropyridine compounds.

EXAMPLE 8

Nicotinonitrile

A mixture of 1.0 gram of 1-acetyl-3-cyano-4-acetoxypiperidine, 900 mg. of 10% palladium on charcoal catalyst and 5 grams of trans stilbene is maintained at 240° C. for 3 hours. The entire reaction mixture containing the product is then cooled and diluted with a mixture of equal parts of benzene-ether and filtered, the product remaining in the filtrate. The product is then extracted into 1 N aqueous hydrochloric acid solution and the hydrochloric acid extract of the product is then made alkaline and back-extracted into chloroform. The chloroform extract is then washed and dried and evaporated under reduced pressure to yield the product in good yield as a residue. The product is obtained in substantially pure form by sublimation of the residue to give material having M.P. 49–51° C.

Similarly, dehydrogenation of other lower alkanoic acid derivatives of 3-cyano-4-hydroxypiperidine with palladium on charcoal in the manner described above produces nicotinonitrile.

EXAMPLE 9

Nicotinonitrile

Approximately 200 mg. of 1-acetyl-3-cyano-1,2,5,6-tetrahydropyridine, 190 mg. of 10% palladium on charcoal catalyst and 2 grams of trans stilbene are maintained at a temperature of 230–240° C. for a period of about 4 hours. The entire reaction mixture is cooled, diluted with a 1:1 solution of benzene and ether, and the insoluble material removed by filtration from the product dissolved in the filtrate. The product is then extracted into 1 N aqueous hydrochloric acid solution and the hydrochloric acid extract of the product is then made alkaline and back-extracted into chloroform. The chloroform extract is then washed and dried and evaporated under reduced pressure to yield the product in good yield as a residue. The product is obtained in substantially pure form by sublimation of the residue to give nicotinonitrile, M.P. 50–51° C.

What is claimed is:

1. A compound of the formula

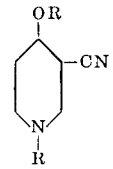

wherein R is lower alkanoyl.

2. A compound of claim 1 which is 1-acetyl-3-cyano-4-acetoxyhexahydropyridine.

3. A tautomeric mixture of 1-lower alkanoyl-3-cyano-4-ketohexahydropyridine and 1-lower alkanoyl-3-cyano-4-hydroxy-1,2,5,6-tetrahydropyridine.

4. A tautomeric mixture of claim 3 consisting of 1-acetyl-3-cyano-4-ketohexahydropyridine and 1 - acetyl-3-cyano-4-hydroxy-1,2,5,6-tetrahydropyridine.

References Cited

Bachman et al.: J. Am. Chem. Soc. 69, 1535 (1947).
Gaylord: "Reduction with Complex Metal Hydrides," Interscience, N.Y. (1956), pp. 100–102.

NORMA S. MILESTONE, Primary Examiner

G. T. TODD, Assistant Examiner

U.S. Cl. X.R.
260—294.7, 294.9